United States Patent [19]

Schiffer

[11] Patent Number: 4,899,620
[45] Date of Patent: Feb. 13, 1990

[54] DRIVE FOR A DOUBLE-WORM EXTRUDER

[75] Inventor: Wernar Schiffer, München, Fed. Rep. of Germany

[73] Assignee: Tet Holding Ges.M.B.H., Korneuburg, Austria

[21] Appl. No.: 256,310

[22] Filed: Oct. 11, 1988

[30] Foreign Application Priority Data

Oct. 8, 1987 [AT] Austria .................. A2642/87

[51] Int. Cl.⁴ .......................... F16H 37/06
[52] U.S. Cl. ................ 74/665 N; 74/665 GA
[58] Field of Search .......... 74/665 GA, 665 L, 665 F, 74/665 N, 665 G; 425/204, 208

[56] References Cited

U.S. PATENT DOCUMENTS

| | | | |
|---|---|---|---|
| 2,892,362 | 6/1959 | Nicholas | 74/665 GA |
| 3,359,826 | 12/1967 | Hanslik | 74/665 GA |
| 3,824,875 | 7/1974 | Willert et al. | 74/665 N X |
| 4,253,345 | 3/1981 | Munster | 74/665 GA |
| 4,261,225 | 4/1981 | Zahradnik | 74/665 GA |
| 4,586,402 | 5/1986 | Schafer | 74/665 GA X |
| 4,679,461 | 7/1987 | Mizuguchi et al. | 74/665 GA |
| 4,682,510 | 7/1987 | DeBernardi | 74/665 N |
| 4,796,487 | 1/1989 | DeBernardi | 74/665 GA |

FOREIGN PATENT DOCUMENTS 2037395 7/1980 United Kingdom .......... 74/665 N

*Primary Examiner*—Dwight G. Diehl
*Attorney, Agent, or Firm*—Herbert Dubno

[57] ABSTRACT

Two worms of a worm extruder are connected to drive shafts of different lengths journaled in a transmission housing. For driving one of the worms, a first gear is keyed to the longer drive shaft and is driven by the motor gear and the electric motor. The second worm is driven by a further shaft, one end of which has a gear meshing with the second gear keyed to the short drive shaft so that the gear of this further shaft and the gears of the two drive shafts lie in a common plane. The further shaft is driven by a gear meshing with the motor shaft or by a separate motor. With this apparatus torque distribution is improved and the number of gears and components of the transmission is reduced.

10 Claims, 2 Drawing Sheets

DRIVE FOR A DOUBLE-WORM EXTRUDER

FIELD OF THE INVENTION

My present invention relates to a drive or transmission for the operation of the two worms of a double-worm extruder, and more particularly, to a transmission for a double-worm extruder of the type in which each of the worms has a drive shaft coaxial therewith, the drive shafts are of different lengths, the longer drive shaft is drivable directly by a motor or through the intermediary of gearing, and the shorter drive shaft is driven through two gears by means of a further shaft.

BACKGROUND OF THE INVENTION

For the operation of a double-worm extruder, a transmission has been provided heretofore in which one of the worms is directly driven via a spur gear arranged on a coaxial shaft while the other worm, which has a coaxial shaft with a gear, is indirectly driven by the spur gear and a number of gears disposed in succession to form a gear train. Thus for the drive of the indirectly driven worm, two parallel shafts connected via respective gears with the spur gear are required and the two interconnected shafts each can be coupled with the other shaft and with the gear of a worm shaft.

This rather complex gearing system with its multiplicity of shafts in addition to the shafts coaxial with the worms, has the disadvantage that its disassembly is complex which makes repair and maintenance difficult, time-consuming and costly.

OBJECTS OF THE INVENTION

It is the principal object of the present invention to provide an improved drive or transmission for a double-worm extruder in which this disadvantage is obviated.

Another object of this invention is to provide an improved drive for a double-worm extruder which allows the delivery of high torque for long periods, is of simple construction, can be assembled and disassembled rapidly and with ease, and which can be repaired or maintained at relatively low cost, quickly and with a minimum of down time of the extruder.

SUMMARY OF THE INVENTION

These objects and others which will become apparent hereinafter are attained, in accordance with the present invention with a transmission or drive for the two worms of a double-worm extruder and of the type in which the worms have respective drive shafts coaxial therewith and of different lengths and whereby the longer drive shaft can be driven by a motor directly or by a motor through the intermediary of gearing and the shorter drive shaft is driven via two gears and one further shaft.

According to the principles of the invention, a gear is provided on the longer drive shaft which meshes with a gear on and connected to the shorter drive shaft and the axis of the gear on the shorter drive shaft and the axis of the gear on the longer drive shaft are coplanar with a gear meshing with the gear of the shorter drive shaft, i.e. the axes of all three gears lie in the same plane.

According to the invention, moreover, the further shaft can be driven directly by an additional electric motor or can be driven by this additional electric motor through the intermediary of gearing or a common electric motor can drive a gear meshing with respective gears on the longer drive shaft and on the further shaft.

Stated otherwise, a worm drive for a double-worm extruder can comprise:

a housing;

a relatively long drive shaft journaled in the housing and connected coaxially to a first worm of a double-worm extruder;

a relatively short drive shaft journaled in the housing parallel to the long drive shaft and connected coaxially to a second worm of the double-worm extruder;

a first gear on the long rive shaft and connected thereto;

a second gear on the short drive shaft meshing directly with the first gear and connected to the short drive shaft;

first drive means operatively connected to the long drive shaft for driving same;

a further shaft journaled in the housing parallel to the long and short shafts;

a third gear on the further shaft meshing directly with the second gear, the first, second and third gears having respective axes lying in a common plane; and second drive means operatively connected to the further shaft for driving same to transmit torque to the second gear, whereby at least some of the torque received by the short shaft is contributed by the second drive means.

The first drive means in this case and the second drive means can include respective electric motors but in any event at least one electric motor is provided and is coupled directly or by gearing to the long shaft and this motor may also be connected via the common gear mentioned earlier to a gear on the further shaft. A separate electric motor can be used to drive the further shaft directly or through gearing and similar gearing can be interposed between the first motor and the long shaft.

The transmission of the invention has the following advantage:

Since the gear on the further shaft and the gear on the short drive shaft are only required to transfer half the torque which is ultimately applied to the short drive shaft, the radial forces which are generated are correspondingly smaller than would be the case if full torque had to be delivered by further shafts to the short drive shaft. Different elastic torsions on the longer and shorter drive shafts under load are avoided by having the first, second and third gear oriented in the common plane.

In addition, torsional play in the transmission can be compensated or taken up by these gears or distributed uniformly across them.

The flank play of the extruder worms can thus be reduced, a characteristic of the invention which has been found to be important for extruder operations generally. The risk of flank contact in operation and resulting damage to the worms is thereby drastically reduced The torque which can be delivered to the worms is high. The overall length of the transmission, notwithstanding the foregoing characteristics, remains relatively short and the number of parts is small; mounting and dismounting, assembly and disassembly, and replacement of parts are greatly simplified.

Because the gear on the shorter drive shaft in effect floats between two gears flanking it, a bending of the shorter drive shaft does not occur, nor is there a tendency toward bending of the gearing.

The width of the gears can be wide, i.e. the gears themselves and their teeth can be comparatively long without any tendency to cant the very sensitive tandem back-pressure bearing of the shorter drive shaft.

The bearing of the shorter drive shaft can be offset outwardly in this case relative to the bearings of the long and further shafts so that relatively large-diameter and expensive single-row bearings can be used.

According to a further feature of the invention, the offset of the bearing of the shorter drive shaft with respect to the neighboring bearings of the further shaft and the long shaft, is at least equal to the bearing depth. The journaled distance for the longer drive shaft remains small as a result. This is of advantage since the tendency toward bending of the longer drive shaft, whose gear is in low-transmitting relationship with the gear of the short drive shaft is reduced.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
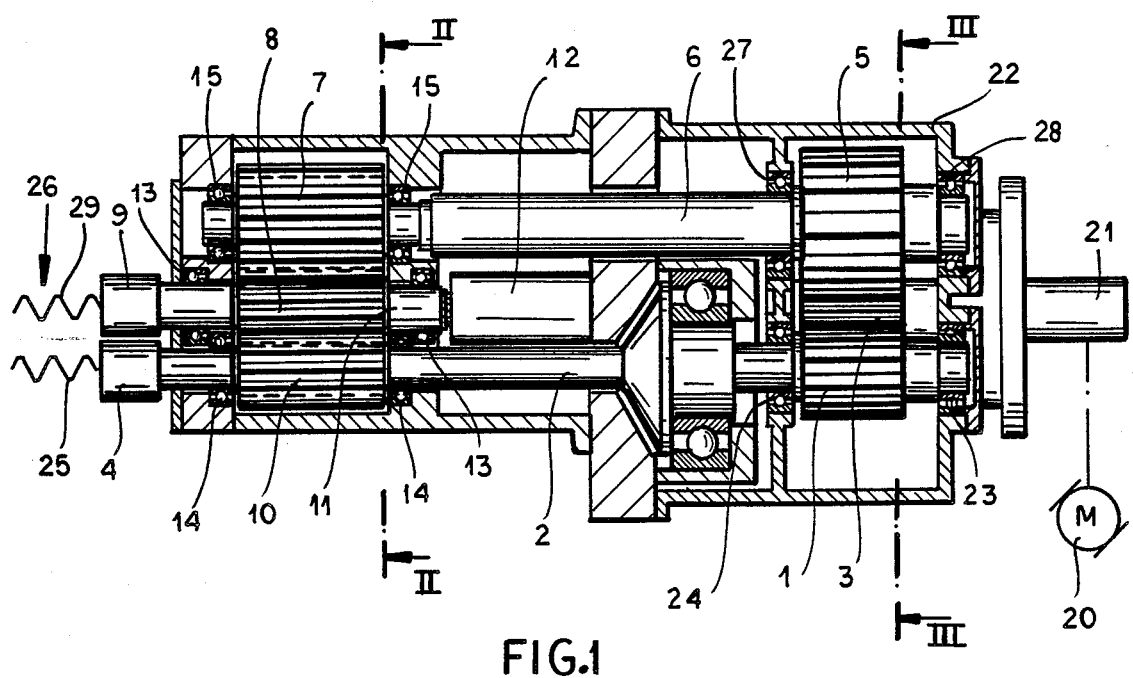
FIG. 1 is an axial cross sectional view through a first embodiment of a transmission for driving a double-worm extruder according to the invention.
Figure 2:
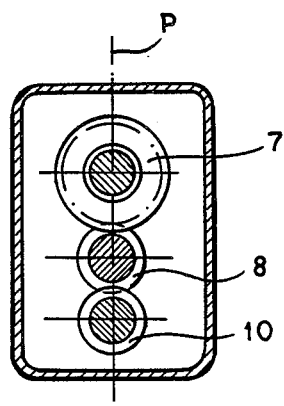
FIG. 2 is a cross sectional view taken along line II—II of FIG. 1.
Figure 3:
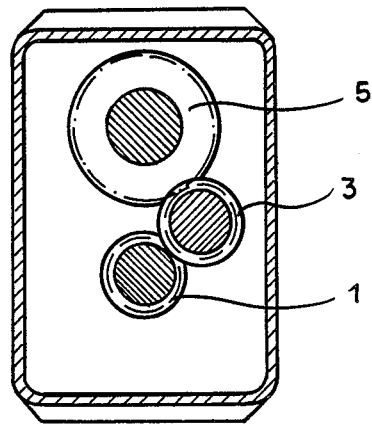
FIG. 3 is a cross sectional view taken along line III—III of FIG. 1.

In the embodiment of FIGS. 1-3, an electric motor 20 is connected to a shaft 21 which drives a drive gear 3 (FIGS. 1 and 3) journaled by means not shown in a housing 22 of the transmission.

A gear 1 is keyed to the longer drive shaft 2 of the transmission and meshes with a gear 3 so as to be driven thereby.

The drive shaft 2 is journaled in the housing in a pair of bearings 14 which will be discussed in greater detail below and in a pair of bearings 23 and 24 flanking the driven gear 1.

The drive shaft 2 is provided with a connector 4 of prismatic or like configuration for transferring torque to one of the worms 25 of a double-worm extruder 26 shown only diagrammatically in FIG. 1.

The drive gear 3 also meshes with and drives a gear 5 which is connected to a further shaft 6 by a circumferential clamping device (not shown).

The further shaft 6 is journaled in the housing 22 at th drive end of this shaft in a pair of bearings 27 and 28.

At the opposite end of the further shaft 6 a gear 7 is keyed, this gear being referred to previously herein as the third gear and being flanked by a further pair of bearings 15 journaling the shaft 6 in the housing.

The gear 7 meshes with and drives a gear 8 keyed to the relatively short drive shaft 11 whose prismatic fitting or connecting profile 9 rigidly connects this drive shaft with the other worm 29 of the double-worm extruder.

The long drive shaft 2 carries a gear 10 which is keyed to this drive shaft and meshes with the gear 8. Gear 10 is equivalent to the first gear previously mentioned and gear 8 is equivalent to the second gear.

As can be seen from FIG. 2, the axes of the three gears 7, 8, 10 lie in a common plane P.

Between the shafts 2 and 6, a tandem bearing 12 for the shaft 11 carrying the worm drive gear 8, is provided. The bearings 13 of the shaft 11 are offset relative to the bearings 14 and 15 of the shafts 2 and 6 at the corresponding ends of respective gears by substantially the depth of the bearings 13. This allows the bearings to be made of larger diameters.

The drive for one of the worms is thus transmitted from the motor 20 by the drive gear 3 to the gear 1 keyed to the shaft 2. At least some torque transmission to the other worm is delivered thereto by the gear 5 also meshing with the motor or drive gear 3 and the further shaft 6, via the gear 7 keyed to the shaft 6 and meshing with the gear 8. Thus both of the gears 7 and 10 mesh with the gear 8.

Figure 4:
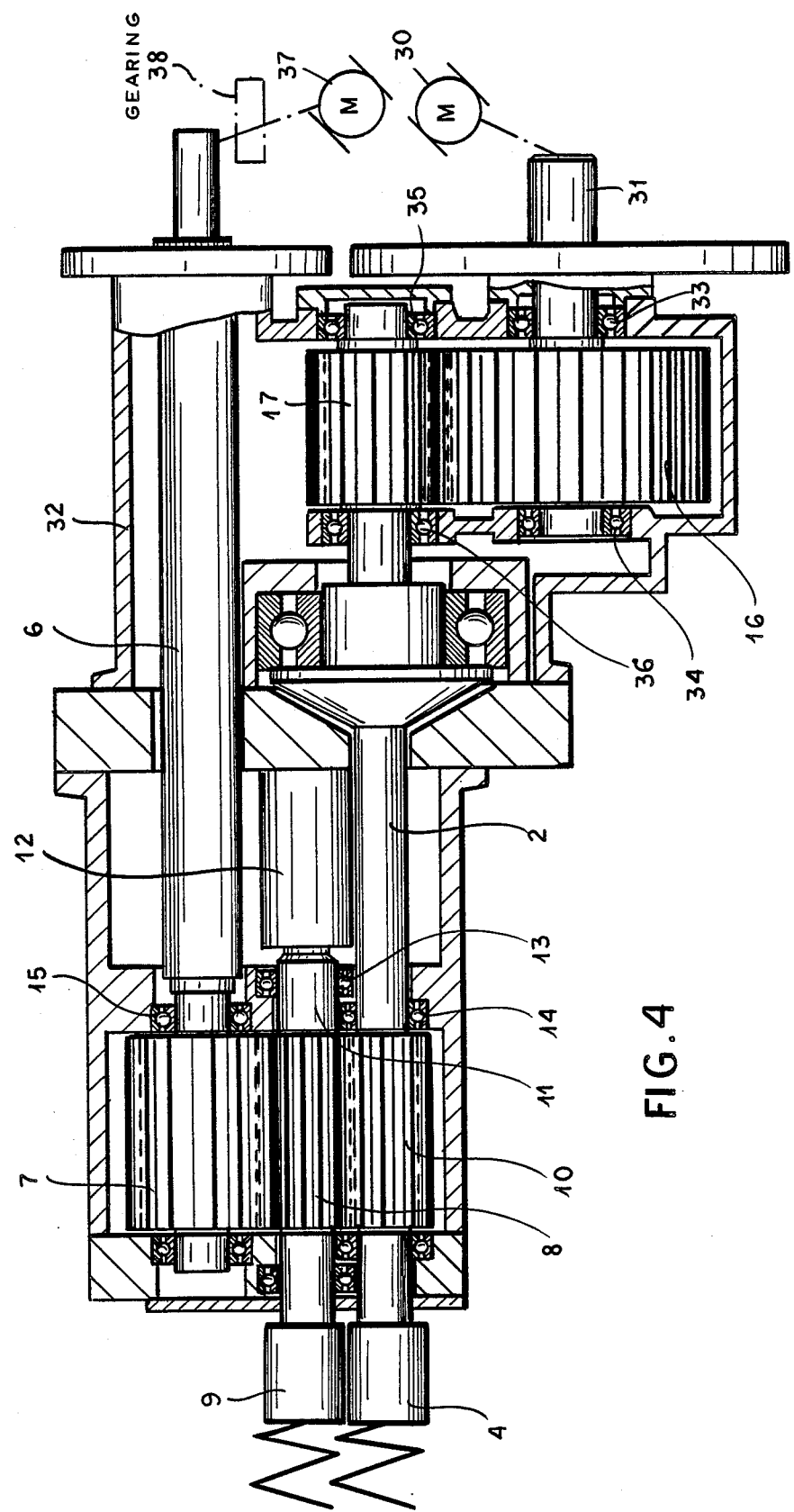
FIG. 4 is a view similar to FIG. 1 but illustrating another embodiment of the invention.

In the embodiment of FIG. 4, long drive shaft 2 and the further shaft 6 are separately drivable.

For example, an electric motor 30 can be connected to a shaft 31 carrying a gear 16 which meshes with a gear 17 keyed to the long drive shaft 2. Gears 16 and 17 thus constitute gearing connecting the motor 30 to the shaft 2. The gears 16 and 17 are journaled in the housing 32 by bearings 33, 34 and 35, 36, respectively.

The shaft 6 can be driven directly by the motor 37 which preferably, like the motor 30, is a direct current motor. Alternatively, gearing 38, like the gear 16, 17, can be interposed between the motor 37 and the shaft 6.

With an appropriate axial spacing between the shafts 2 and 6, the gearing 38 can be built into the housing 32 as well. Both gearings, however, and any other step-down stages which may be required, can be provided outside the housing as well. Otherwise the embodiment of FIG. 4 has the same features as the embodiment of FIGS. 1-3.

An embodiment in which the shafts 2 and 6 are driven by respective dc motors and step-down gearing has the advantage that the torque difference between the drive shafts 2 and 11 can be established by the difference in the current draws of the 2 dc motors. The maximum allowable torque of each worm can thus be reliably limited. Damage and interruption of operation and worm breakage by overload can be precluded or limited.

Even should a worm break occur, the costs can be reduced with the system of the invention since the transmissions of the invention utilize fewer parts and can be more readily assembled and disassembled for maintenance, replacement and repair. Because of the higher operating reliability of the system of the invention which allows exact torque limitation, the worms can operate with higher loads on average because low fluctuations are reduced so that the extruder for a given diameter, can have higher outputs.

I claim:

1. A worm drive for a double-worm extruder, comprising:
   a housing;
   a relatively long drive shaft journaled in said housing and connected coaxially to a first worm of a double-worm extruder;
   a relatively short drive shaft journaled in said housing parallel to said long drive shaft and connected coaxially to a second worm of said double-worm extruder;
   a first gear on said long drive shaft and connected thereto;

a second gear on said short drive shaft meshing directly with said first gear and connected to said short drive shaft;

first drive means operatively connected to said long drive shaft for driving same;

a further shaft journaled in said housing parallel to said long and short shafts;

a third gear on said further shaft meshing directly with said second gear, said first, second and third gears having respective axes lying in a common plane; and second drive means operatively connected to said further shaft for driving same to transmit torque to said second gear, whereby at least some of the torque received by said short shaft is contributed by the second drive means.

2. The drive defined in claim 1 wherein said first drive means includes an electric motor.

3. The drive defined in claim 2 wherein said first drive means includes gearing between said electric motor and said long shaft.

4. The drive defined in claim 2 wherein said second drive means includes a direct-current electric motor operatively connected with said further shaft.

5. The drive defined in claim 4 wherein said second drive means includes gearing between said direct-current electric motor and said further shaft.

6. The drive defined in claim 4 wherein said direct-current electric motor is directly connected to said further shaft.

7. The drive defined in claim 2 wherein said second drive means includes a further electric motor operatively connected to said further shaft.

8. A worm drive for a double-worm extruder, comprising:

a housing;

a relatively long drive shaft journaled in said housing and connected coaxially to a first worm of a double-worm extruder;

a relatively short drive shaft journaled in said housing parallel to said long drive shaft and connected coaxially to a second worm of said double-worm extruder;

a first gear on said long drive shaft and connected thereto;

a second gear on said short drive shaft meshing directly with said first gear and connected to said short drive shaft;

first drive means including an electric motor operatively connected to said long drive shaft for driving same;

a further shaft journaled in said housing parallel to said long and short shafts;

a third gear on said further shaft meshing directly with said second gear, said first, second and third gears having respective axes lying in a common plane; and second drive means operatively connected to said further shaft for driving same to transmit torque to said second gear, whereby at least some of the torque received by said short shaft is contributed by the second drive means, said first drive means further including a drive gear driven by said motor and meshing with a driven gear on said long shaft.

9. The drive defined in claim 8 wherein said second drive means includes a further driven gear on said further shaft meshing directly with said drive gear.

10. A worm drive for a double-worm extruder, comprising:

a housing;

a relatively long drive shaft journaled in said housing and connected coaxially to a first worm of a double-worm extruder;

a relatively short drive shaft journaled in said housing parallel to said long drive shaft and connected coaxially to a second worm of said double-worm extruder;

a first gear on said long drive shaft and connected thereto;

a second gear on said short drive shaft meshing directly with said first gear and connected to said short drive shaft;

first drive means including an electric motor operatively connected to said long drive shaft for driving same;

a further shaft journaled in said housing parallel to said long and short shafts;

a third gear on said further shaft meshing directly with said second gear, said first, second and third gears having respective axes lying in a common plane; and second drive means operatively connected to said further shaft for driving same to transmit torque to said second gear, whereby at least some of the torque received by said short shaft is contributed by the second drive means, said first drive means further including a drive gear driven by said motor and meshing with a driven gear on said long shaft, said second drive means including a further electric motor operatively connected to said further shaft, said short shaft being journaled at an end thereof in said housing with a journal bearing which is axially offset by at least the bearing depth thereof from respective bearings journaling said long shaft and said further shaft in said housing.

* * * * *